Patented Aug. 9, 1932

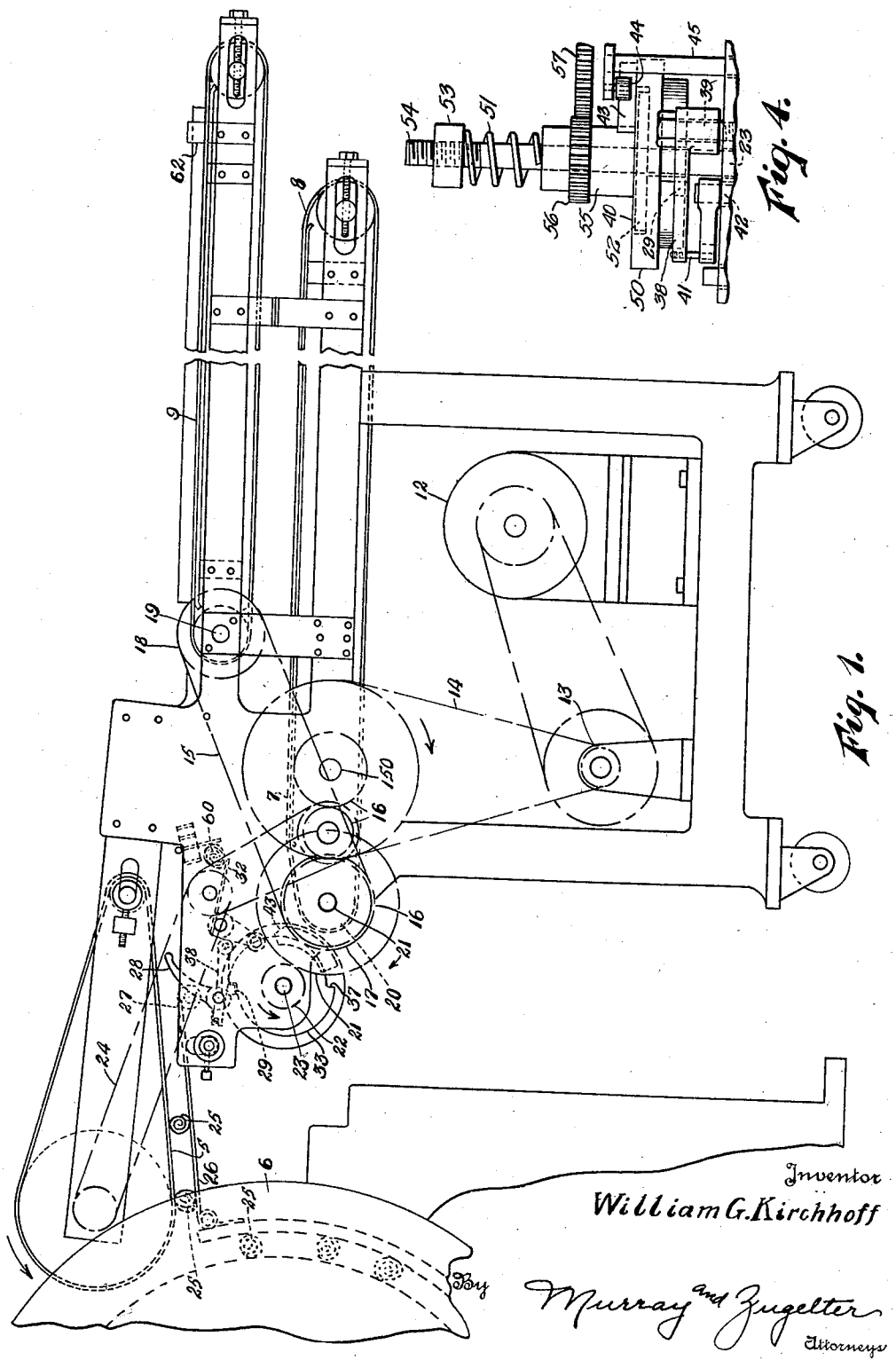

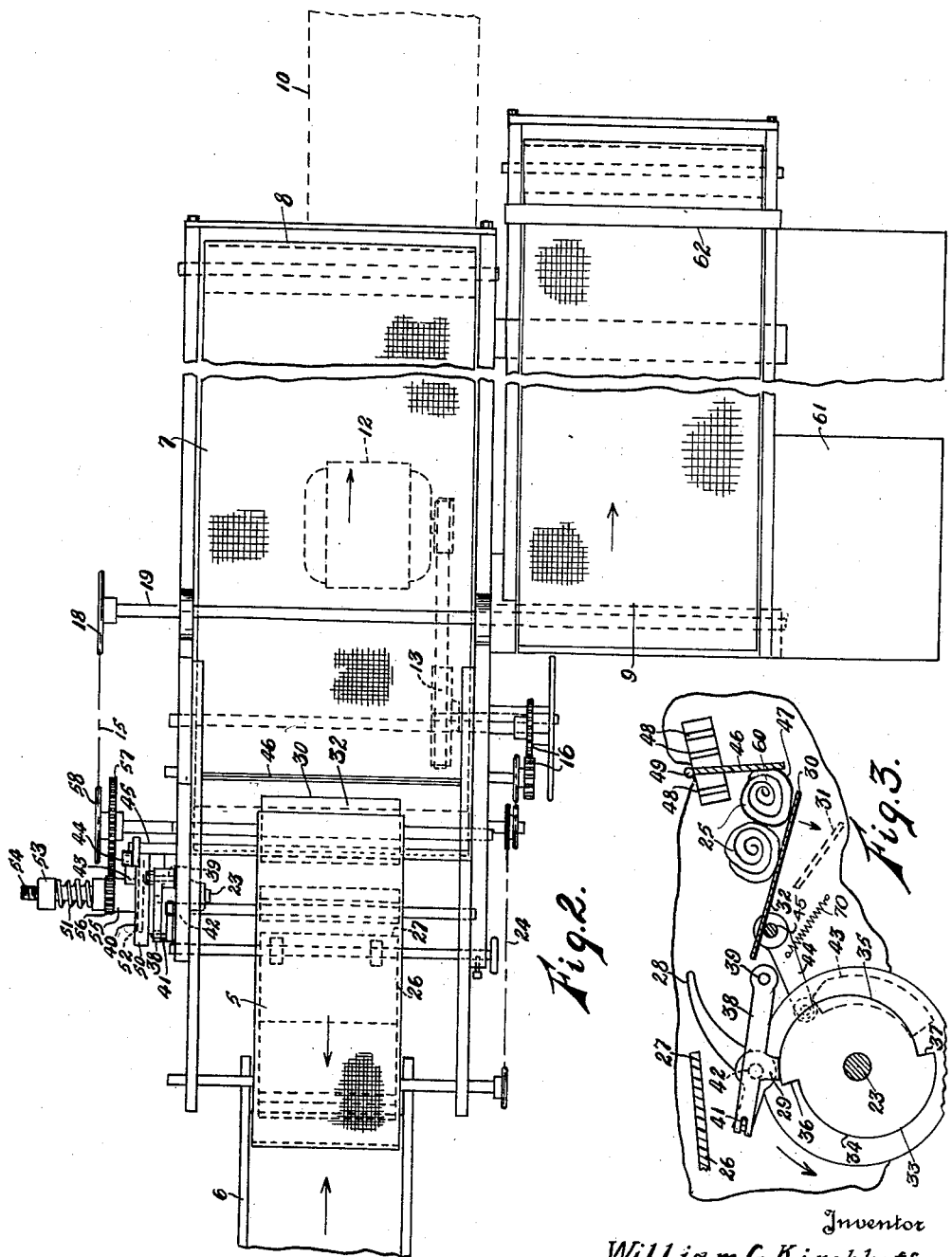

1,871,216

UNITED STATES PATENT OFFICE

WILLIAM G. KIRCHHOFF, OF CINCINNATI, OHIO, ASSIGNOR TO THE J. H. DAY COMPANY, OF CINCINNATI, OHIO, A CORPORATION OF OHIO

TWIN LOAF ASSEMBLER

Application filed May 14, 1931. Serial No. 537,321.

This invention relates to a dough working machine for the delivery of twin loaves of dough which, upon delivery, may be deposited in pans or upon a suitable support, in the form of double loaves, or they may be twisted either manually or automatically for the formation of loaves of bread known as twin loaves.

An object of the invention is to provide a machine comprising a novel arrangement of conveyors and means for receiving single successive loaves from a molder or the like, and for automatically delaying alternate loaves for discharge thereof simultaneously as double or twin loaves.

Another object is to provide in a machine of the character stated, an extremely simple and dependable means for assembly and discharge of double or twin loaves, said means being designed to maintain great accuracy in the timing of loaf movement. These and other objects are attained by the means described herein and disclosed by the accompanying drawings, in which:

Fig. 1 is a side elevational view of the device of the invention, showing its cooperative relationship with a loaf molder.

Fig. 2 is a top plan view of the device shown in Fig. 1.

Fig. 3 is a view illustrating more or less diagrammatically the relationship of certain parts of the machine.

Fig. 4 is an enlarged plan view of a clutch mechanism disclosed in Fig. 2.

In general, the device of the invention comprises a conveyor belt 5 or other suitable mechanism for removing shaped loaves of dough from a dough molder drum 6, whence the loaves are deposited in a loaf delaying mechanism which, subsequent to collecting or accumulating two or more loaves, deposits them as a unit upon a conveying means 7 adjacent the end 8 of which an operator removes the double or collected loaves and places them in pans positioned on a moving conveyor 9. The operator's position or station is indicated at 10.

The conveyors 7 and 9 may be operated in a common direction, as indicated by the arrows in Fig. 2, by any suitable means such as a motor 12 associated with a suitable countershaft or change speed device 13 adapted to drive, by means of a chain or the like 14, a main drive shaft 150. By means of the cooperative gears 16, a sprocket 17 may be rotated and caused to drive the conveyor 9 by means of a chain or other power transmission means 15 engaging the said sprocket and a sprocket 18 fixed to the conveyor shaft 19. The conveyor belt 8 may be driven by reason of its passing over a suitable roller 20 fixed on the shaft 21 which carries the sprocket 17. Any suitable means, such as the gears 21 and 22 may be provided for rotation of a cam shaft 23. The conveyor belt 5 may be driven by means of a chain or the like 24 receiving motion from one of the shafts driven by power from the motor 12.

As indicated in Fig. 1, the shaped loaves of dough 25 are removed from the dough molder 6 by means of the belt 5 which rolls the loaves positively along a pressure board 26 located adjacent and substantially parallel to the belt 5. Located near the end 27 of the pressure board, is a member 28, extending normally in the path of movement of the loaves and adapted to be moved thereby for the purpose of conditioning a tripping means, shown in Fig. 3, which initiates actuation of a means for retarding or delaying disposition of the loaves on the twin loaf conveyor 7. The member 28 may be termed a momentary latch release, since its function is to momentarily displace a latch 29 which controls movement of a movable door that may be tripped for releasing pairs of loaves for disposition upon the twin loaf conveyor. The operative and inoperative positions of the movable door 32 are indicated at 30 and 31, respectively, in Fig. 3. From the disclosure therein, it should be apparent that the two loaves 25 which are shown resting on the door, will be released upon movement of the door to the inoperative position shown at 31. The door 32 may be held in the operative or raised position by any suitable yielding means such as the weight of the arm 44, or by a spring 70.

As stated before, the movable door will not tilt when the first loaf 25 is deposited thereon, but as soon as the second loaf trips the momentary latch 28, mechanism is set in operation for positively tilting the door and releasing the loaves in unison for disposition thereof upon the moving twin loaf conveyor 7. A description of the power actuating means for tripping or moving the door only upon the passing of every second loaf, is given in the following paragraph.

The means just referred to comprises a cam 33 fixedly mounted on the cam shaft 23 and consisting of eccentric surfaces 34 and 35 broken by steps or step off portions 36 and 37, which steps provide abutments for cooperating with the latch 29 of the momentary trip means 28. From the disclosure in Fig. 3 it will be readily apparent that upon moving to the tripped position indicated, the member 28 had moved the latch arm 38 upwardly about its pivot 39 for displacing the latch 29 from the normal position of Fig. 1, to the abnormal or raised position of Fig. 3, thereby permitting a constantly driven slipping clutch 40 to rotate the normally stationary cam shaft 23. The connection at 41, between the members 28 and 38, may be a slot and pin connection adapted to compensate for the slight relative longitudinal movement resulting from movement of the arms 28 and 38 about their respective pivots 42 and 39.

Upon a half rotational movement of the cam in the direction indicated by the arrow (Fig. 3), a cam face or extension 43 rotates with the cam 23 and strikes a rocker arm 44 which is fixed relative to the door 32 and the rocker shaft 45, for effecting tilting of the door to the inoperative position indicated at 31. It will be noted that a half rotation of the cam 33 disposes the door moving cam 43 in a location diametrically opposite to that shown in Fig. 3, whereby, upon the next succeeding actuation of the cam 33, the door operating cam 43 will not move far enough to strike the rocker arm 44. In other words, alternate half rotations of the cam shaft will effect tilting of the trap door. The first loaf received on the trap door is held thereon by any suitable stop element or abutment plate 46, which may be suitably mounted upon the frame of the machine. Any suitable means may be provided for varying the normal distance between the abutment plate and the trap door. The size of the loaves will determine the magnitude of the space between said members, it having been found desirable to provide a large space during the handling of large loaves, so that release of the loaves is immediate, and substantially unrestricted. A conventional means for adjusting the space is shown in Fig. 3, wherein 48 indicates a plurality of parallel spaced grooves in which the abutment plate may be received. Such grooves, of course, are provided at opposite sides of the machine so as to provide for uniform adjustment at both ends of the abutment plate. Any suitable means such as a stop 49 may be provided for limiting the extent to which the ends of the abutment plate may enter the grooves.

A description of the slipping clutch 40 and its drive means follows.

The slipping type of clutch is shown only for the purpose of presenting one form of operative machine, and it is to be distinctly understood that any other type of mechanism which can be used to intermittently effect a driving relation between the cam 33 and a driver therefor, may be employed as a substitute for the slipping clutch. As an example of a means for intermittently effecting this driving relation, there is illustrated in Figs. 2 and 4 a rotatable member or disc 50 keyed or otherwise secured to the camshaft 23, which disc has yieldingly urged thereupon, by means of a spring or the like 51, a power driven disc 52 which upon the application of sufficient resistance to rotation of the camshaft 23, will slip relative the disc 50 whereby to terminate rotational movement of the camshaft 23 and cam 33. The latch 29 provides the above mentioned resistance to rotation of the cam and camshaft, as was explained in a previous paragraph. The nut or adjusting means 53 on the end of the cam shaft driver 54 provides for varying the compressive force of the friction clutch spring 51. The drive disc 52 of the clutch may have a hub 55 carrying a gear 56 or other power transmission means which may be rotated by suitable power transmission means (57—58—15—18) receiving movement from a constantly rotating part of the machine, for example, the conveyor drive shaft 19. From the foregoing it should be readily apparent that as long as the latch 29 is in the operative position of Fig. 1, for precluding rotation of the cam 33, there will be a slippage between the clutch members 50 and 52 and consequently rotation of the member 50 will not be imparted to the camshaft and the cam 33. However, upon raising of the latch 29 as in Fig. 3, the cam 33 will be rotated until the latch strikes the step or abutment 37, which is 180 degrees from the opposite step 36. A half rotation thereby is imparted to the cam and camshaft. It will be clearly apparent, from Figs. 2 and 4, that the trip cam 43 is fixed to the clutch member 50, or it may be fixed to some other part which is fixed for movement with the camshaft and cam 33. The directions of conveyor movement are indicated by means of arrows applied thereto on the drawings.

The operation of the device is as follows: It is understood, of course, that the rolled loaves are formed initially in the primary molder 6, whence they are removed by the take-off means or belt 5. It will be assumed that one loaf is in position on the movable door as at 60, Fig. 1. The next succeeding loaf is carried forwardly by the take-off means and it depresses the momentary trip 28, which lifts the latch 29 (as shown in Fig. 3) thereby releasing the cam 33 and permitting a half rotation thereof by the friction clutch 40. The trip cam 43, moving with the cam, strikes the end of arm 44 and tilts the door 32 about its pivotal mounting 45 for release of the two loaves in unison, which loaves fall upon the moving twin loaf conveyor 7, in side by side relation. Rotation of the cam is terminated by means of the step or abutment 37 of the cam striking the latch 29 which has followed the eccentric periphery 35 of the cam. Obviously, the cam is stopped at the termination of a half rotation thereof, which disposes the trip cam 43 on the opposite side of the shaft 23. The next succeeding loaf is then advanced by the belt 5 and depresses the momentary trip 28, thereby again, and in like manner, releasing the cam 33 for another half rotational movement. This time, however, the movable door is unaffected for the reason that movement of the trip cam 43 is stopped, with the cam, before it reaches a position in contact with the end of the arm 44, this position being shown in Figure 1. Therefore, the loaf which last depressed the trip 28 rests upon the substantially closed door 32, as indicated in Fig. 1. Advancement of a succeeding loaf, however, effects depression of the trip 28 while the trip cam 43 is adjacent the trip arm 44, (see Fig. 3) whereupon tripping of the door is effected and that loaf, and the delayed loaf 60, are released simultaneously to fall upon the twin loaf conveyor 7. It is clear, therefore, that alternate actuations of the trip 28 effect a movement of the door for release of accumulated loaves.

Upon reaching the operator's position indicated at 10, (Fig. 2), the loaves are removed by the operator who twists them together and disposes them in bake pans advanced by a pan conveyor 9 which is replenished with pans by an operator at the position indicated by 61. The pan conveyor may be provided with a suitable stop or abutment 62 which may hold the pans in a desired position until they become filled. If desired, the twin loaves may be discharged, in an untwisted condition, from the twin loaf conveyor 7, or they may be discharged into a device for automatically twisting the loaves.

The mechanical action of the device is so quick and certain that the accurate timing of loaf movement maintained in the molder 6 is not interfered with, and this renders the device very desirable for use in large bakeries where volume production is greatly dependent upon accuracy in the timing of loaf movements. The loaf following each delayed loaf 60 does not, in practice, stop during its movement over the door 32, but it merely strikes the delayed loaf and they immediately fall, in unison, onto the twin loaf conveyor.

By varying the number of stops on the cam 33, three or more small loaves may be accumulated in the machine before discharge onto the conveyor 7.

It is to be understood that various modifications and changes in structural details of the device may be made, within the scope of the appended claims, without departing from the spirit of the invention.

What is claimed is:

1. In a dough loaf assembler the combination of a means for feeding individual loaves of dough in succession, means for accumulating a plurality of loaves and including a movable door and a cooperative adjustable stop associated therewith, and a door moving means operated by alternate fed loaves for moving the door and releasing the accumulated loaves as a unitary parcel.

2. In combination a pair of adjacent conveyors one adapted to convey loaves of dough and the other for conveying containers therefor, a means for feeding individual loaves in succession, means for accumulating a plurality of said loaves, and a release means disposed adjacent the loaf conveyor and actuated by alternate loaves advanced by the feeding means, for releasing accumulated loaves as a unitary parcel from the accumulator onto the loaf conveyor for movement thereof to the container conveyor.

3. In combination a pair of adjacent conveyors one adapted to convey loaves of dough and the other for conveying containers therefor, a means for feeding individual loaves in succession, means including an abutment and a substantially flat door opening toward the loaf conveyor and movable to operative and inoperative positions for accumulating a plurality of said loaves, and a release means disposed adjacent the loaf conveyor and actuated by alternate loaves advanced by the feeding means, for releasing accumulated loaves as a unitary parcel from the accumulator onto the loaf conveyor for movement thereof to the container conveyor.

4. In combination a dough molder for discharging individual loaves of dough in succession, a pair of adjacent conveyors one adapted to convey loaves of dough and the other for conveying containers therefor, a means for feeding individual loaves in succession, means for accumulating a plurality of said loaves, and a release means disposed adjacent the loaf conveyor and actuated by alternate loaves advanced by the feeding means, for releasing accumulated loaves as a unitary parcel from the conveyor for movement thereof to the container conveyor.

5. A loaf assembler having in combination a loaf conveyor and a pan conveyor adjacent thereto, a loaf take off device for projecting individual loaves in succession, means cooperatively associated with the take off device for receiving and accumulating a predetermined number of the individually fed loaves said means comprising a trap door movable to operative and inoperative positions but being normally in an operatively closed position, and means for tripping the door to the inoperative position at the instant the last loaf of an accumulated group is projected toward the door from the feeding means, whereby the said last fed loaf spends part of its inertia to move the other loaf or loaves from the door on to the loaf conveyor as a unitary parcel.

6. A loaf assembler having in combination a loaf take off device for forcefully projecting individual loaves in succession, means cooperatively associated with the take off device for receiving and accumulating a plurality of the individually fed loaves said means comprising a trap door movable to operative and inoperative positions but being normally in an operatively closed position, and means for tripping the door to the inoperative opened position at the instant every second loaf is projected toward the door from the feeding means, whereby said second loaf spends part of its inertia to move the other loaf, and itself, past the opened door.

7. In a dough loaf assembler the combination of a means for removing from a loaf molder individual loaves of dough in succession, and serving also to advance said loaves, a trap door normally held in a closed position for accumulating a predetermined number of said advanced loaves, means for mounting the trap door for rocking movement, a rocker arm movable with said trap door said rocker arm having a free end, a cam shaft, a door actuating cam supported by said cam shaft and movable through a circle, the free end of the rocker arm being located normally in the circular path of movement of the cam, means for driving the cam, a trip device controlling the cam driving means and located so as to be struck by every loaf advanced toward the trap door, and means associated with the cam and the trip device for determining the parts of a circle through which the door actuating cam may move, upon each actuation of the trip device, before striking the rocker arm.

8. In a dough loaf assembler the combination of a means for feeding individual loaves of dough in succession, means for accumulating a plurality of loaves including a movable door held normally in an operative raised position and a cooperative stop member associated with the door, means for adjusting the stop member toward and from the door to provide for accommodation of various sized dough loaves, and a release means operated by the loaves themselves for intermittently releasing the accumulated loaves as a unitary parcel.

In testimony whereof, I have hereunto subscribed my name this 1st day of May, 1931.

WILLIAM G. KIRCHHOFF.